United States Patent
Reynolds et al.

(10) Patent No.: US 7,822,550 B2
(45) Date of Patent: Oct. 26, 2010

(54) ENVIRONMENTAL CHARACTERISTIC DETERMINATION

(75) Inventors: Christopher I. Reynolds, Walpole, MA (US); Donald Heckathorn, Norfolk, MA (US); Michael Perlmutter, Sherborn, MA (US); Ian Humphrey, Foxboro, MA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 12/592,415

(22) Filed: Nov. 23, 2009

(65) Prior Publication Data

US 2010/0114487 A1 May 6, 2010

(51) Int. Cl.
*G01C 21/00* (2006.01)
(52) U.S. Cl. .................. 701/220; 701/221; 702/141; 304/207.13; 304/162
(58) Field of Classification Search ............ 324/207.13, 324/162; 701/220–221, 207; 702/141; 73/488
See application file for complete search history.

(56) References Cited

U.S. PATENT DOCUMENTS

| | | | | |
|---|---|---|---|---|
| 4,303,978 A * | 12/1981 | Shaw et al. | ................. | 701/220 |
| 5,225,838 A * | 7/1993 | Kanter et al. | ................. | 342/61 |
| 5,555,503 A * | 9/1996 | Kyrtsos et al. | ............. | 701/207 |
| 5,774,829 A * | 6/1998 | Cisneros et al. | ............ | 701/213 |
| 6,243,657 B1 * | 6/2001 | Tuck et al. | .................. | 702/150 |
| 6,474,159 B1 * | 11/2002 | Foxlin et al. | ................. | 73/488 |
| 6,681,629 B2 * | 1/2004 | Foxlin et al. | ................. | 73/488 |
| 6,768,944 B2 * | 7/2004 | Breed et al. | ................. | 701/301 |
| 6,988,026 B2 * | 1/2006 | Breed et al. | ................. | 701/29 |
| 7,085,637 B2 * | 8/2006 | Breed et al. | ................. | 701/38 |
| 7,110,880 B2 * | 9/2006 | Breed et al. | ................. | 701/207 |
| 7,202,776 B2 * | 4/2007 | Breed | ......................... | 340/435 |
| 7,302,316 B2 * | 11/2007 | Beard et al. | ................... | 701/11 |
| 7,415,126 B2 * | 8/2008 | Breed et al. | ................. | 382/100 |
| 7,421,321 B2 * | 9/2008 | Breed et al. | ................... | 701/29 |
| 7,434,482 B1 * | 10/2008 | Van Steenwyk et al. | ..................... | 73/862.625 |
| 7,491,567 B2 * | 2/2009 | DCamp et al. | ................ | 438/51 |
| 7,698,082 B2 * | 4/2010 | Lee | ............................ | 702/88 |
| 2002/0198632 A1* | 12/2002 | Breed et al. | .................... | 701/1 |
| 2003/0191568 A1* | 10/2003 | Breed | ......................... | 701/36 |

(Continued)

FOREIGN PATENT DOCUMENTS

EP 1787948 A2 * 5/2007

(Continued)

OTHER PUBLICATIONS

Efficient acquisition and analysis of digital signals in pin-limited system-on-package; Mostardini, L. et al.; Research in Microelectronics and Electronics Conference, 2007. PRIME 2007. Ph.D.; Digital Object Identifier: 10.1109/RME.2007.4401864 Publication Year: 2007, pp. 269-272.*

(Continued)

*Primary Examiner*—Cuong H Nguyen
(74) *Attorney, Agent, or Firm*—Carmen Patti Law Group, LLC

(57) ABSTRACT

A processor of an apparatus in one example makes a determination of an environmental characteristic based on an average of a plurality of concomitant values that correspond to the environmental characteristic.

8 Claims, 5 Drawing Sheets

U.S. PATENT DOCUMENTS

| | | | |
|---|---|---|---|
| 2003/0209893 A1* | 11/2003 | Breed et al. | 280/735 |
| 2005/0060069 A1* | 3/2005 | Breed et al. | 701/29 |
| 2005/0134440 A1* | 6/2005 | Breed | 340/435 |
| 2005/0137786 A1* | 6/2005 | Breed et al. | 701/200 |
| 2006/0058928 A1* | 3/2006 | Beard et al. | 701/11 |
| 2010/0079334 A1* | 4/2010 | Roh et al. | 342/357.02 |

FOREIGN PATENT DOCUMENTS

| | | | |
|---|---|---|---|
| EP | 1828047 A1 * | 9/2007 | |
| EP | 2124019 A2 * | 11/2009 | |
| JP | 2008524008 W * | 7/2008 | |
| JP | 2009282030 A * | 12/2009 | |
| SG | 132639 A1 * | 6/2007 | |
| WO | WO 2006068907 A1 * | 6/2006 | |

OTHER PUBLICATIONS

Fully Compensated Method for Earth Rotation Measurement with Micromechanical Yaw-rate Gyro; Kolev, N. et al; Intelligent Data Acquisition and Advanced Computing Systems: Technology and Applications, 2005. IDAACS 2005. IEEE; Digital Object Identifier: 10.1109/IDAACS.2005.283025; Publication Year: 2005 , pp. 464-467.*

The time-domain discrete Green's function method (GFM) characterizing the FDTD grid boundary; Holtzman, R et al.; Antennas and Propagation, IEEE Transactions on; vol. 49 , Issue: 7; Digital Object Identifier: 10.1109/8.933488; Publication Year: 2001 , pp. 1079-1093.*

FPGA-based Advanced Digital Signal Inspector for internal signals of pin-limited systems-on-package; Mostardini, L. et al.; Intelligent Data Acquisition and Advanced Computing Systems: Technology and Applications, 2009. IDAACS 2009. IEEE International Workshop on Digital Object Identifier: 10.1109/IDAACS.2009.5343033; pp. 21-26.*

An integrated reduced inertial sensor system—RISS / GPS for land vehicle; Iqbal, U.; Okou, A.F.; Noureldin, A.; Position, Location and Navigation Symposium, 2008 IEEE/ION; Digital Object Identifier: 10.1109/PLANS.2008.4570075 Publication Year: 2008 , pp. 1014-1021.*

Low-Cost Three-Dimensional Navigation Solution for RISS/GPS Integration Using Mixture Particle Filter; Georgy, J.; Noureldin, A.; Korenberg, M.J.; Bayoumi, M.M.; Vehicular Technology, IEEE Transactions on; vol. 59 , Issue: 2 Digital Object Identifier: 10.1109/TVT.2009.2034267; Publication Year: 2010 , pp. 599-615.*

Effects of Harsh Electromagnetic Environment on Inertial Measurement Unit of a Flight Vehicle; Yu Zhi-yong; Wang Jiang-feng; Chen Guo-dong; Xia Jian-ping; Electromagnetic Compatibility, 2007. EMC 2007. International Symposium on; Digital Object Identifier: 10.1109/ELMAGC.2007.4413492; Publication Year: 2007 , pp. 307-310.*

* cited by examiner

ENVIRONMENTAL CHARACTERISTIC DETERMINATION

TECHNICAL FIELD

The invention relates generally to signal processing and more particularly to error reduction in gyroscopes and accelerometers.

BACKGROUND

Electronic sensors are often used for measurement of environmental characteristics. Gyroscopes are capable of measuring inertial characteristics, such as angular rate and/or acceleration. In known inertial measurement units ("IMUs"), a single gyroscope is used for each range of motion that is to be measured. For example, IMUs employ a gyroscope for pitch, a gyroscope for roll, and a gyroscope for yaw. In some applications additional gyro(s) may be used for redundancy so that on the event of a gyro failure the redundant gyros(s) data may be used.

Outputs from gyroscopes may be unstable due to error terms that vary over time. Some error terms are caused by environmental changes to the gyroscope, such as temperature fluctuation, shock, and vibration. The error terms may or may not be correlated with each other and may or may not vary between gyroscopes. A specialized and more precise gyroscope may be used to reduce the error terms, but at a higher manufacturing cost.

Thus, a need exists for reduced error terms in environmental characteristic measurements without higher manufacturing costs.

SUMMARY

The invention in one implementation encompasses an apparatus. The apparatus comprises: plurality of concomitant values indicative of an environmental characteristic; and a processor having a plurality of inputs for receiving the plurality of concomitant values and having an output that provides a determination of the environmental characteristic; wherein the processor determines the environmental characteristic based on a combination of the plurality of concomitant values.

Another implementation of the invention encompasses a method. The method comprises: determining, via a plurality of independent electronic sensors, a plurality of independent, concomitant values indicative of an environmental characteristic; calculating, via a processor, an average of the plurality of independent, concomitant values of the environmental characteristic; and providing the average of the plurality of independent, concomitant values as a single value indicative of the environmental characteristic.

A further implementation of the invention encompasses an apparatus. The apparatus comprises an inertial measurement unit that provides a pitch angular rate measurement, a roll angular rate measurement, and a yaw angular rate measurement. The inertial measurement unit comprises: a pitch circuit that comprises a pitch processor and a plurality of independent pitch sensors; a roll circuit that comprises a roll processor and a plurality of independent roll sensors; and a yaw circuit that comprises a yaw processor and a plurality of independent yaw sensors. The pitch processor receives a plurality of concomitant pitch values from the plurality of independent pitch sensors. The pitch processor determines an average of the concomitant pitch values. The roll processor receives a plurality of concomitant roll values from the plurality of independent roll sensors. The roll processor determines an average of the concomitant roll values. The yaw processor receives a plurality of concomitant yaw values from the plurality of independent yaw sensors. The yaw processor determines an average of the concomitant yaw values. The inertial measurement unit provides the average of the concomitant pitch values as the pitch angular rate measurement. The inertial measurement unit provides the average of the concomitant roll values as the roll angular rate measurement. The inertial measurement unit provides the average of the concomitant yaw values as the yaw angular rate measurement.

DESCRIPTION OF THE DRAWINGS

Features of exemplary implementations of the invention will become apparent from the description, the claims, and the accompanying drawings in which:

DETAILED DESCRIPTION

Figure 1:
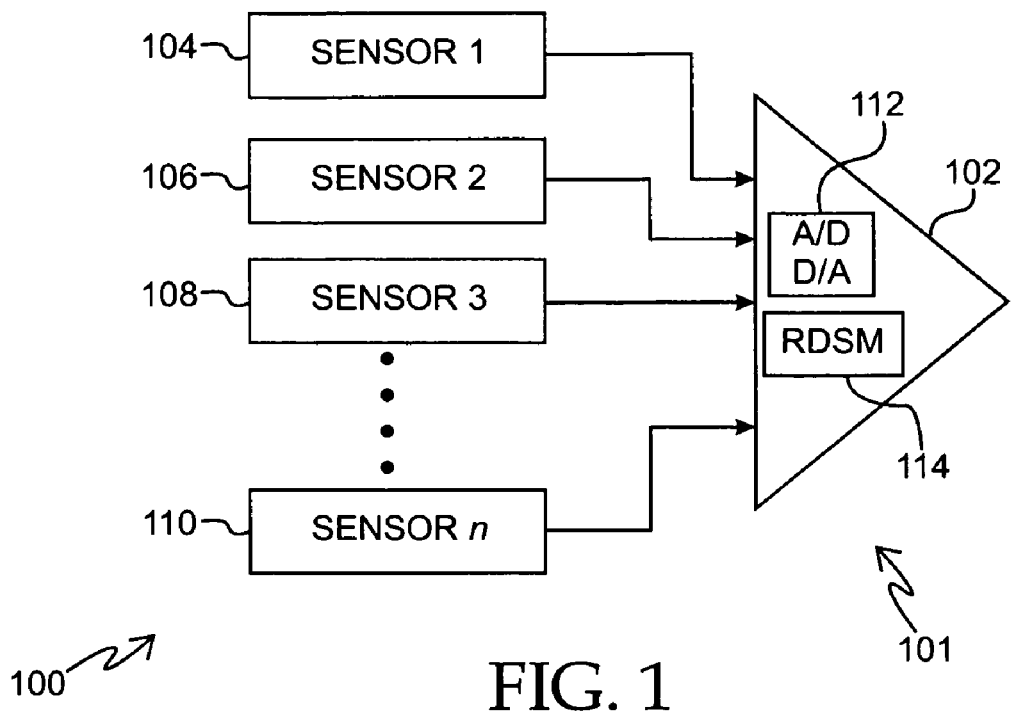
FIG. 1 is a representation of one implementation of an apparatus that comprises a circuit with a processor and a plurality of sensors.

Turning to FIG. 1, an apparatus 100 in one example comprises a circuit 101. The circuit 101 in one example comprises a processor 102 and a plurality of n sensors, for example, sensors 104, 106, 108, and 110. The processor 102 in one example comprises a signal processor. For example, the processor 102 receives signals from the sensors 104, 106, 108, and 110. The processor 102 in one example comprises a digital signal processor. In another example, the processor 102 comprises an analog signal processor. In yet another example, the processor 102 comprises an analog/digital converter 112 ("A/D D/A") for conversion of signals between an analog format and a digital format. The processor 102 makes a determination of an environmental characteristic based on an average of a plurality of concomitant values that correspond to the environmental characteristic. The processor 102 in one example comprises an instance of a recordable data storage medium 114 ("RDSM"), as described herein.

The sensors 104, 106, 108, and 110 comprise electronic sensors. The sensors 104, 106, 108, and 110 serve to obtain a plurality of concomitant values that correspond to the environmental characteristic for the processor 102. For example, the sensors 104, 106, 108, and 110 measure the environmental characteristic. The environmental characteristic in one example comprises an inertial characteristic, for example, an angular rate or angular acceleration. In another example, the environmental characteristics comprise temperature, pressure, strain, electrical field strength, and/or magnetic field strength. The sensors 104, 106, 108, and 110 in one example comprise one or more gyroscopes for measuring the angular rate and/or one or more accelerometers for measuring the angular acceleration. In a further example, the sensors 104, 106, 108, and 110 comprise Micro-Electro-Mechanical Systems (MEMS) gyroscopes and/or accelerometers. The gyroscopes and/or accelerometer in one example are single- and/or multi-axis. In one example, the gyroscopes and/or accelerometers are oriented along a same axis. In another example, the gyroscopes and/or accelerometers are oriented along different axes. For example, the angular rates are mathematically combined through employment of relative scaling to obtain a measurement for a desired axis, as will be appreciated by those skilled in the art.

The sensors 104, 106, 108, and 110 in one example comprise independent sensors. For example, each of the sensors 104, 106, 108, and 110 provides a value that corresponds to a measurement of the environmental characteristic. The sensors 104, 106, 108, and 110 in one example provide the values at and/or from a pre-determined time. For example, the sensors 104, 106, 108, and 110 are synchronized with a pre-determined clock signal. In another example, the sensors 104, 106, 108, and 110 operate in real-time. For example, the sensors 104, 106, 108, and 110 provide a continuous output of the value. The sensors 104, 106, 108, and 110 in one example provide the values substantially in parallel, as will be appreciated by those skilled in the art.

Figure 2:
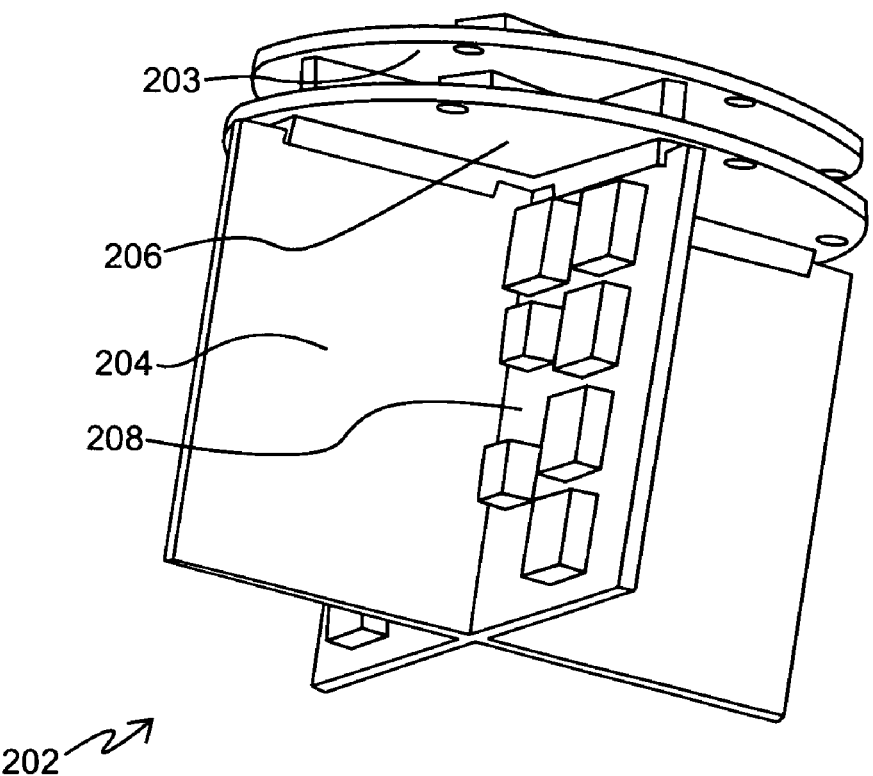
FIG. 2 is a representation of another implementation of the apparatus of FIG. 1 that comprises a plurality of circuit boards.

Turning to FIG. 2, an inertial measurement unit 202 in one example comprises a plurality of circuits 101 and a support circuit 203. For example, each circuit 101 corresponds to a dimension of travel. In one example, the circuits 101 comprise a pitch circuit 204, a roll circuit 206, and a yaw circuit 208. The inertial measurement unit 202 employs the pitch circuit 204, the roll circuit 206, and the yaw circuit 208 to provide a pitch angular rate measurement, a roll angular rate measurement, and a yaw angular rate measurement, respectively. In one example, the pitch circuit 204, the roll circuit 206, and the yaw circuit 208 are functionally and electrically identical. For example, the pitch circuit 204, the roll circuit 206, and the yaw circuit 208 are oriented orthogonally to each other to provide the pitch angular rate measurement, the roll angular rate measurement, and the yaw angular rate measurement, as will be appreciated by those skilled in the art.

The support circuit 203 is electrically coupled with the pitch circuit 204, the roll circuit 206, and the yaw circuit 208. The support circuit 203 in one example comprises one or more communication and/or power interfaces and support logic for the pitch circuit 204, the roll circuit 206, and the yaw circuit 208. In one example, the support circuit 203 routes power from an external source to the pitch circuit 204, the roll circuit 206, and the yaw circuit 208. In a further example, the support circuit 203 outputs the pitch angular rate measurement, the roll angular rate measurement, and the yaw angular rate measurement through an output interface. The support circuit 203 in one example comprises a signal processor for processing the pitch angular rate measurement, the roll angular rate measurement, and the yaw angular rate measurement before outputting the pitch angular rate measurement, the roll angular rate measurement, and the yaw angular rate measurement.

An illustrative description of exemplary operation of the apparatus 100 is presented, for explanatory purposes. Each sensor of the plurality of sensors 104, 106, 108, and 110 determines a value that corresponds to a measurement of the environmental characteristic. For example, the plurality of independent sensors determine a plurality of independent values. In one example, each of the plurality of independent values is from a same, pre-determined time. For example, the plurality of independent values are concomitant. The processor 102 obtains the plurality of independent values from the plurality of sensors 104, 106, 108, and 110. The values for the environmental characteristic comprise error terms, for example, a drift scaling factor, noise, and drift rate. The processor 102 makes a determination of the environmental characteristic based on an average of the plurality of values to reduce an effect of the error terms, as will be appreciated by those skilled in the art.

The processor 102 in one example receives each value of the plurality of values at a same, pre-determined time. The processor 102 determines a summation value for the plurality of values. For example, the processor 102 adds the concomitant values together to obtain the summation value. In a further example, the processor 102 multiplies each value of the plurality of values by a pre-determined weighting value. For example, where a first gyroscope is known to be more accurate than a second gyroscope, the processor 102 multiplies the value from the first gyroscope by a weighting value of two and multiplies the value from the second gyroscope by a weighting value of one. Thus, the processor 102 gives the first gyroscope a higher priority than the second gyroscope.

The processor 102 divides the summation value by a scaling value to obtain an average of the plurality of values. Where the processor 102 employs weighting values as described above, the average comprises a weighted average. In one example, the scaling value is equal to the number n of the plurality of sensors. For example, a scaling factor of the average of the plurality of values is equal to one. In another example, the scaling value is smaller than the number n and the scaling factor is greater than one. The scaling factor can be increased or decreased by adjusting the scaling value. The processor 102 in one example outputs the average of the plurality of values to one or more of a navigation, control, and/or inertial guidance system, as will be appreciated by those skilled in the art.

The processor 102 in one example determines the average of the plurality of concomitant values to reduce a number of error terms in the measurement of the environmental characteristic. For example, where an error term of a value from a first sensor is uncorrelated with a value from other sensors, the processor 102 determines the average to reduce a magnitude of the error term. The error term may be reduced as a square root of the number n of sensors. For example, where the processor 102 employs four sensors, the error term is reduced by a factor of two. In another example where the processor 102 employs sixteen sensors, the error term is reduced by a factor of four. Since the processor 102 reduces the number of error terms by determining the average, a required level of quality for the sensors can be reduced. For example, a plurality of inexpensive MEMS gyroscopes can be used in place of a single, expensive gyroscope, as will be appreciated by those skilled in the art.

Figure 3:
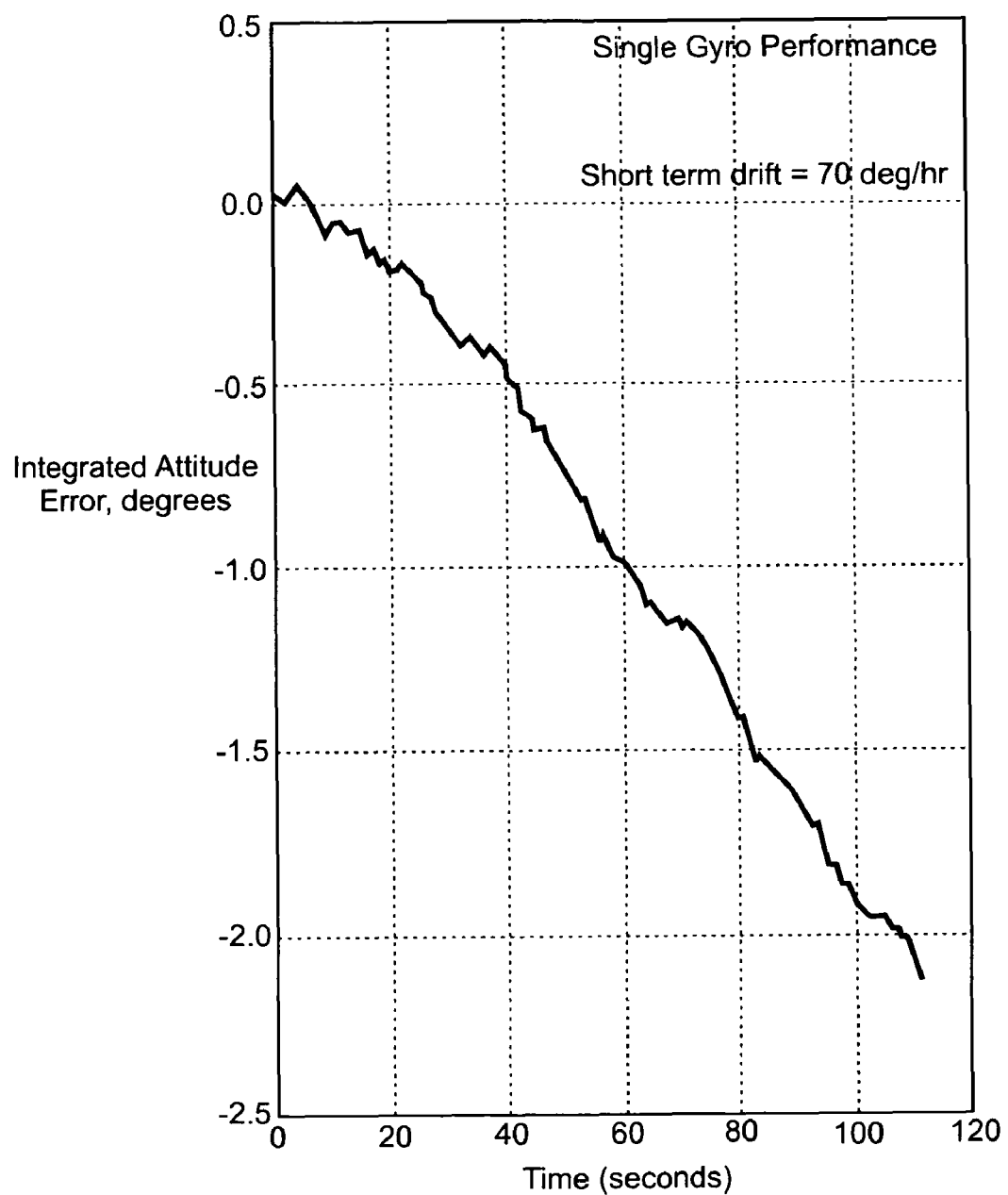
FIG. 3 is a representation of an exemplary plot of short term drift for a single gyroscope.
Figure 4:
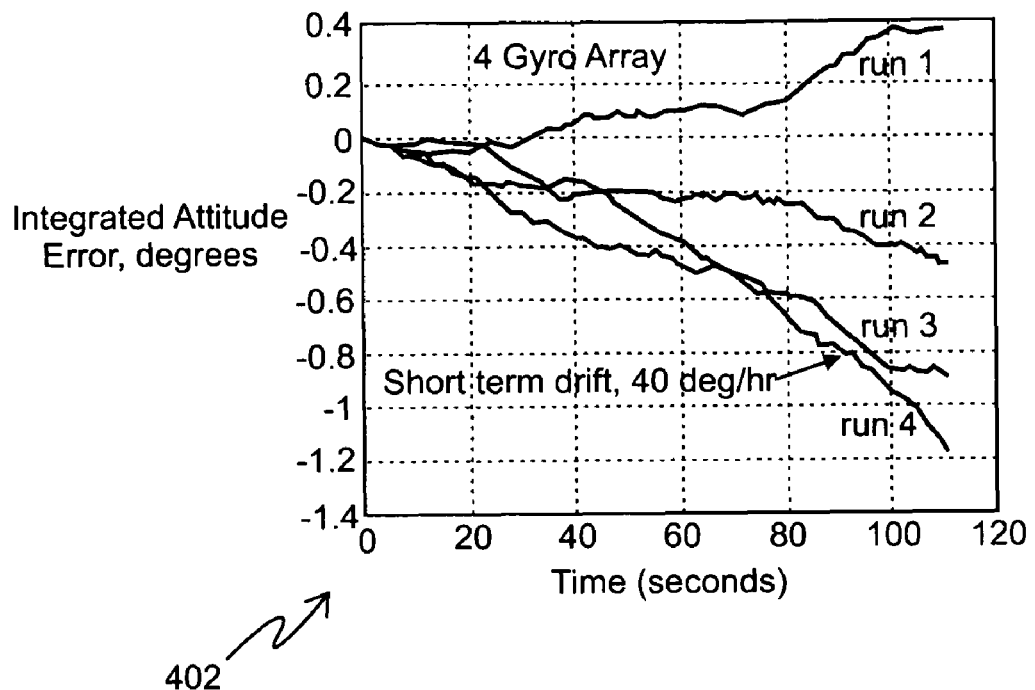
FIG. 4 is a representation of exemplary plots of short term drift for the apparatus of FIG. 1 where the plurality of sensors comprises four gyroscopes.
Figure 5:
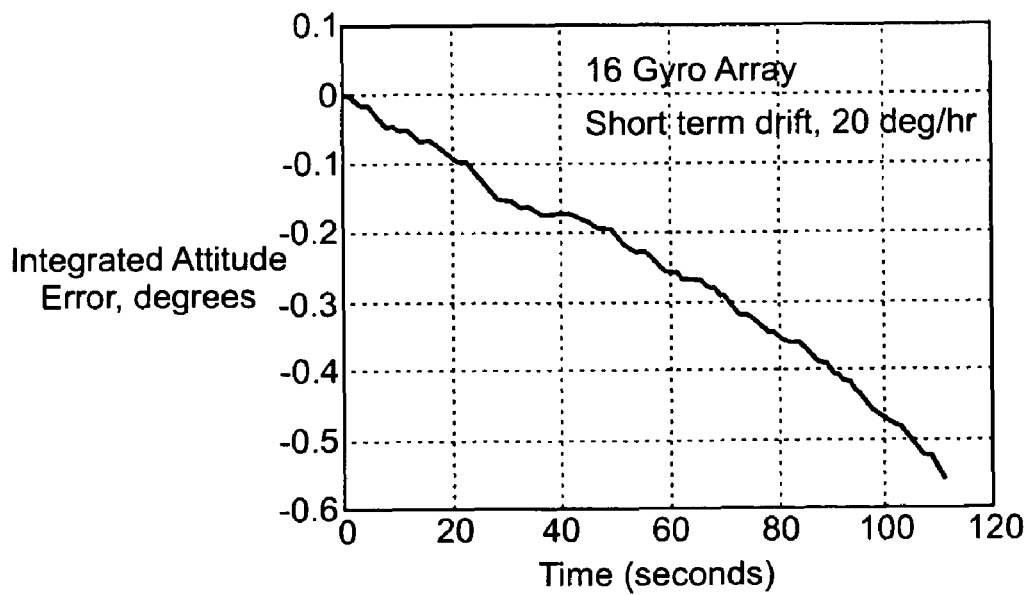
FIG. 5 is a representation of an exemplary plot of short term drift for the apparatus of FIG. 1 where the plurality of sensors comprises sixteen gyroscopes.

Turning to FIGS. 3-5, plots 302, 402, and 502 comprise plots of short term drift samples for one or more gyroscopes. Referring to FIG. 3, the plot 302 comprises a plot of a short term drift sample for a single gyroscope. The short term drift is approximately seventy degrees per hour. Referring to FIG. 4, the plot 402 comprises four short term drift samples (Run 1, Run 2, Run 3, and Run 4) for the apparatus 100 where the plurality of n sensors comprises four gyroscopes. The short term drift of Run 4 was the highest of the four samples and reduced to approximately forty degrees per hour, an improvement of approximately 1.75 times the single gyroscope sample of FIG. 3. Referring to FIG. 5, the plot 502 comprises a plot of a short term drift sample for the apparatus 100 where the plurality of n sensors comprises sixteen gyroscopes. The short term drift was reduced to approximately twenty degrees per hour, an improvement of approximately 3.5 times the single gyroscope sample of FIG. 3.

Figure 6:
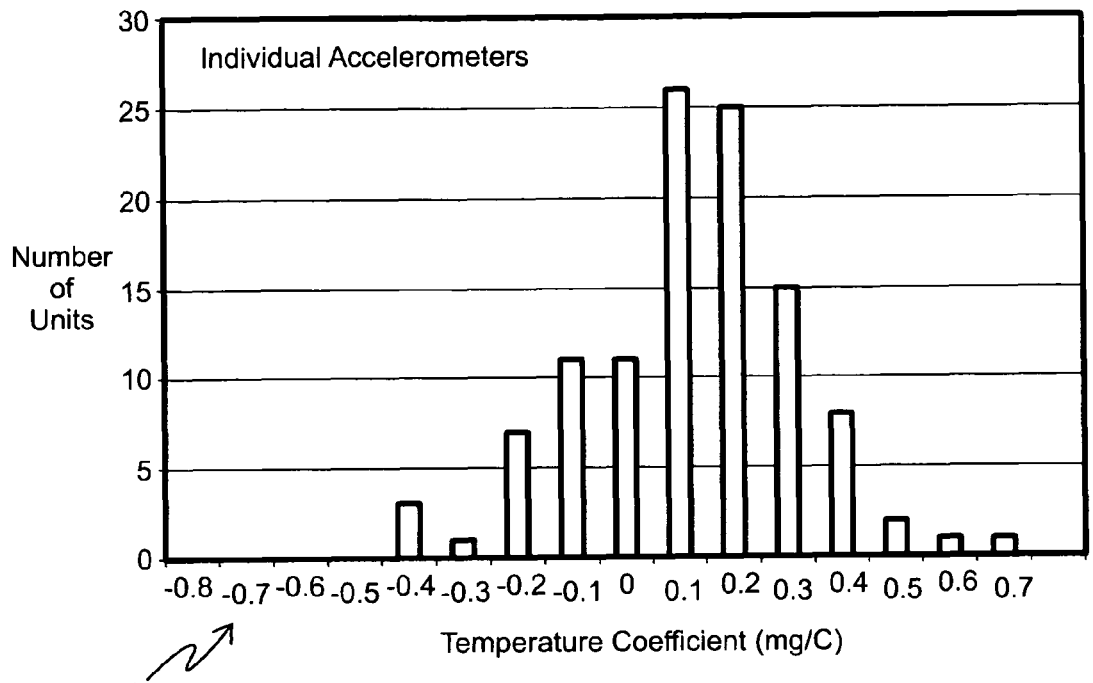
FIG. 6 is a representation of an exemplary histogram of temperature coefficient for individual accelerometers.
Figure 7:
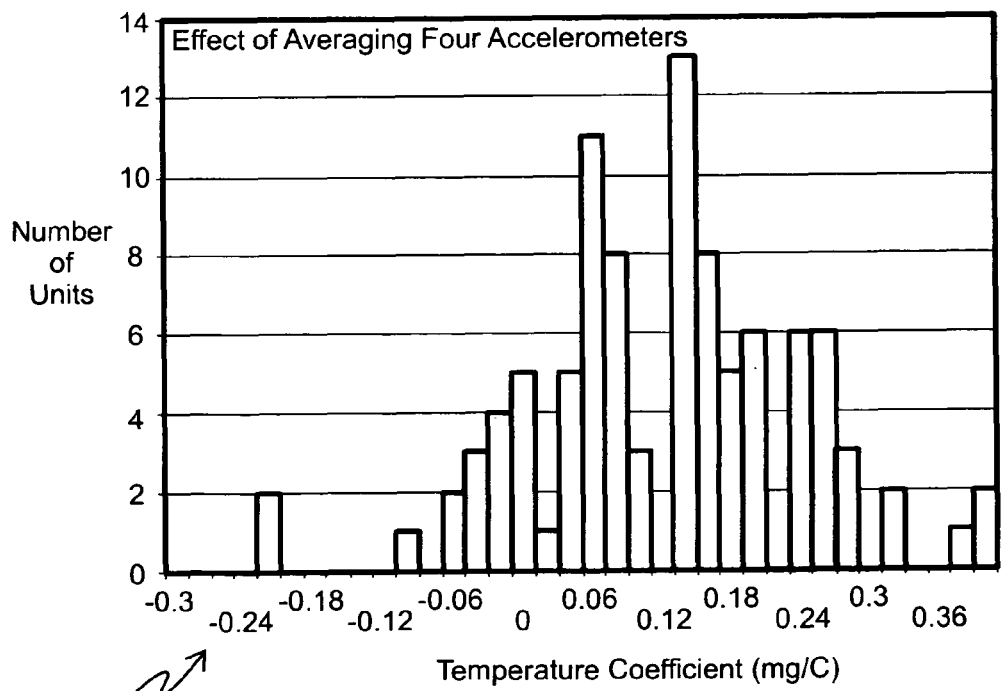
FIG. 7 is a representation of an exemplary histogram of temperature coefficient for the apparatus of FIG. 1 where the plurality of sensors comprises four accelerometers.
Figure 8:
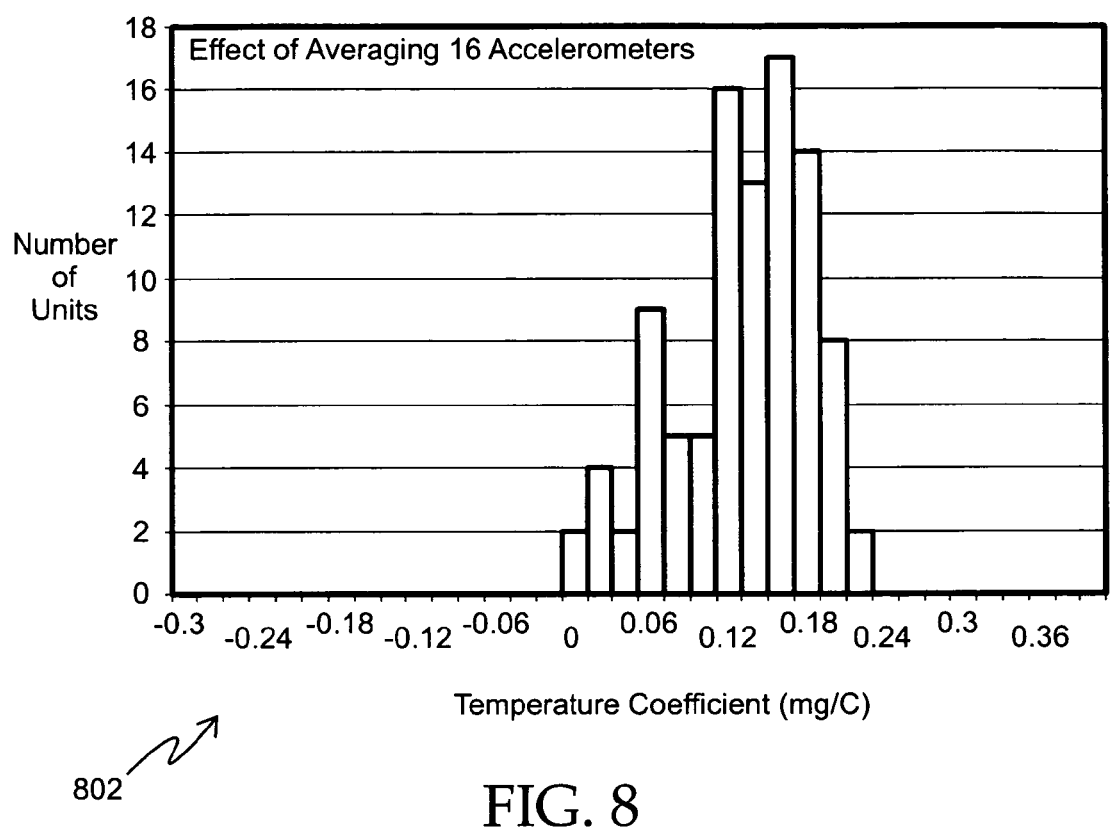
FIG. 8 is a representation of an exemplary histogram of temperature coefficient for the apparatus of FIG. 1 where the plurality of sensors comprises sixteen accelerometers.

Turning to FIGS. 6-8, histograms 602, 702, and 802 comprise sample histograms of a temperature coefficient for a plurality of accelerometers. The histograms 602, 702, and 802 are based on approximately 110 individual accelerometer samples. Referring to FIG. 6, the histogram 602 shows that temperature coefficients for the individual accelerometers were approximately within a range of 1.1, between −0.4 and 0.7. Referring to FIG. 7, sets of four randomly selected individual accelerometer samples were averaged. This reduced the range of temperature coefficients for the samples to approximately 0.62, between −0.22 and 0.40, an improvement of approximately 1.77 times the range of the individual accelerometer samples of FIG. 7. Referring to FIG. 8, sets of sixteen randomly selected individual accelerometer samples were averaged. This reduced the range of temperature coefficients for the samples to approximately 0.22, between 0.0 and 0.22, an improvement of approximately 5.0 times the range of the individual accelerometer samples of FIG. 6.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 114 of the processor 102. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, comprising:
    determining, via a plurality of independent electronic sensors, a plurality of independent, concomitant values indicative of an environmental characteristic;
    calculating, via a processor, an average of the plurality of independent, concomitant values of the environmental characteristic; and
    providing the average of the plurality of independent, concomitant values as a single value indicative of the environmental characteristic;
    wherein the step of calculating comprises the step of:
        multiplying each of the plurality of independent, concomitant values by at least one weighting value, wherein the at least one weighting value is based on accuracy levels of the plurality of independent sensors.

2. The method of claim 1, wherein the plurality of independent electronic sensors comprise at least one of gyroscopes and accelerometers.

3. The method of claim 1, wherein the plurality of independent electronic sensors comprise at least one of single-axis and/or multi-axis gyroscopes.

4. The method of claim 1, wherein the processor performs at least one of an analog-to-digital conversion and a digital-to-analog conversion on at least one of the plurality of independent, concomitant values before a determination of the average of the plurality of independent, concomitant values.

5. The method of claim 4, wherein the environmental characteristic comprises at least one of an angular rate and angular acceleration;
    wherein the processor provides the single value for the at least one of the angular rate and the angular acceleration to a navigation, control, and inertial guidance system.

6. The method of claim 1, wherein the step of determining comprises the step of:
    obtaining the plurality of independent, concomitant values within a pre-determined time period.

7. The method of claim 1, wherein the step of calculating comprises the steps of:
    multiplying a number of the plurality of independent, concomitant values by a scaling factor to obtain a scaling value;
    performing a summation of the plurality of independent, concomitant values to obtain a summation value;
    dividing the summation value by the scaling value.

8. The method of claim 1, wherein the environmental characteristic comprises at least one of angular rate, angular acceleration, temperature, pressure, strain, electrical field strength, and magnetic field strength.

* * * * *